(12) United States Patent
Brasher et al.

(10) Patent No.: US 7,530,485 B1
(45) Date of Patent: May 12, 2009

(54) METHOD FOR EXPLOSIVE BONDING OF TUBULAR METAL LINERS

(75) Inventors: David G. Brasher, Sequim, WA (US); Donald J. Butler, Sequim, WA (US)

(73) Assignee: High Energy Metals, Inc., Sequim, WA (US)

( * ) Notice: Subject to any disclaimer, the term of this patent is extended or adjusted under 35 U.S.C. 154(b) by 176 days.

(21) Appl. No.: 11/702,799

(22) Filed: Feb. 6, 2007

Related U.S. Application Data

(60) Provisional application No. 60/771,081, filed on Feb. 7, 2006.

(51) Int. Cl.
*B23K 20/08* (2006.01)

(52) U.S. Cl. .......................... 228/107; 228/2.5

(58) Field of Classification Search .................. None
See application file for complete search history.

(56) References Cited

U.S. PATENT DOCUMENTS

| | | | | |
|---|---|---|---|---|
| 3,562,897 A | * | 2/1971 | Buchwald | 228/108 |
| 3,590,877 A | * | 7/1971 | Leopold et al. | 138/89 |
| 3,728,780 A | * | 4/1973 | Chang | 228/108 |
| 3,740,826 A | * | 6/1973 | Baba | 228/107 |
| 3,761,004 A | * | 9/1973 | Hanson et al. | 228/2.5 |
| 4,099,661 A | | 7/1978 | Dick | |
| 4,162,758 A | * | 7/1979 | Mikarai | 228/131 |
| 4,193,529 A | | 3/1980 | Dick | |
| 4,527,623 A | | 7/1985 | Baird | |
| 4,564,226 A | * | 1/1986 | Doherty, Jr. | 285/334 |
| 4,708,280 A | | 11/1987 | Bement | |
| 4,860,656 A | | 8/1989 | Hardwick | |
| 4,879,890 A | | 11/1989 | Hardwick | |
| 5,104,027 A | | 4/1992 | Persson | |
| 5,242,098 A | | 9/1993 | Hardwick | |
| 5,259,547 A | | 11/1993 | Hardwick | |
| 5,261,591 A | | 11/1993 | Hardwick | |

FOREIGN PATENT DOCUMENTS

| | | |
|---|---|---|
| GB | 2209978 | 6/1989 |
| GB | 2209979 | 6/1989 |

OTHER PUBLICATIONS

Brasher, et al., "Explosive Welding and Bonding of Multilaminates", Shock Waves for Industrial Applications, pp. 216-236, 1998 Noyes Publications, USA.

* cited by examiner

*Primary Examiner*—Kiley Stoner
(74) *Attorney, Agent, or Firm*—Virginia P. Shogren

(57) ABSTRACT

An explosion welding method for metal tube liners in which a metal tube of smaller outside diameter is positioned coaxially within a metal tube of larger inside diameter with one or more shims inserted at opposed tube ends to form a uniform annular gap. The tubes are vertically positioned on a flat surface, and the smaller tube is filled with explosive material detonated from its top surface. The detonation initiates a uniform explosive front traveling down the smaller tube expanding the internal surface of the smaller tube with sufficient velocity to weld the tubes. A vacuum may be formed within the annular gap and/or gas(es) introduced therein to prevent build-up of excessive heat at the explosive front.

10 Claims, 2 Drawing Sheets

METHOD FOR EXPLOSIVE BONDING OF TUBULAR METAL LINERS

CROSS REFERENCE TO RELATED APPLICATION

This application claims priority under 35 USC 119(e) of Provisional Patent Application Ser. No. 60/771,081 filed Feb. 7, 2006, entitled "Method for Explosive Bonding of Tubular Metal Liners," which is hereby incorporated by reference in its entirety.

FIELD OF THE INVENTION

The invention relates to the use of explosives to metallurgically weld a metal tube liner to the internal surface of a larger metal tube.

BACKGROUND OF THE INVENTION

Explosive welding of metals has been in practice commercially since the mid 1960's and involves the use of explosives to accelerate metals into each other with sufficient velocity and at an angle to allow a metallurgical joint to be created. The process is well suited to bonding flat sheets and plates together. Initially, the industry focused on creating products involving flat materials such as composite metal plates used for stamping coins and corrosive resistant metal composites for the chemical process industries.

The process of explosive welding has been adapted for the purpose of bonding coaxial tubes, but typically has been limited to using explosives to implode a larger tube onto a smaller tube. The typical tube explosively bonded using this technique is 12 to 24 inches (30.5 to 61 cm) long. Lengths of 60 inches (152.4 cm) have been achieved, but with significant difficulty and added expense. Bonding longer length tubes is problematic due primarily to the difficulty in: 1) ensuring uniform density and detonation velocity of the explosive over the entire length of the tube; and 2) preventing excessive heat from accumulating at the surfaces that are being bonded as the air is pushed out between the two tubes during the explosive event. The added heat can create resolidified melt pockets and intermetallics at the bonded joint which are typically brittle and degrade the quality of the joint. In addition, variation in the forces at the detonation front of the explosives can create wrinkles and anomalies in the imploding larger tube as it collapses onto the smaller tube.

U.S. Pat. Nos. 5,261,591 and 5,259,547, both to Hardwick, disclose methods for producing explosively welded coaxial tubes of longer lengths comprising explosively welding tubes in short lengths, followed by mechanically working the tubes into longer lengths using techniques such as extrusion and drawing. Such techniques are expensive, time-consuming and require specialized equipment.

U.S. Pat. No. 4,879,890 also to Hardwick discloses a method of explosively expanding a tubular metal component into engagement with a surrounding metal component using an insert comprising a hollow cylindrical container and shock wave transmitting liquid such as water. Likewise, U.S. Pat. No. 4,708,280 to Bement discloses a tool to insert inside a metal tube for explosively joining tubes comprising an initiator, a tool form, and one or more bands of ribbon explosive wrapped around the tool to form the joining charge. Use of inserts or tools is expensive and requires a customized tool or insert to fit the size of metal tube involved. Techniques involving inserts also are associated with the uneven transfer of energy to the tube to be bonded. In addition, use of liquid environments requires fixturing to contain the liquids and liquid between the explosive and the tube decreases the pressure on the expanding tube.

Accordingly, there is a need in the art for a uniform, reliable, consistent, and cost-efficient method of welding metal tubes to the inside of larger metal tubes, including tubes of longer lengths, that does not require an insert, tool, liquid environment, extrusion or drawing, and which provides a uniform detonation front and dissipation of heat generated at the explosive front.

THE INVENTION

Summary of the Invention

The inventive method comprises the initiation of a detonation front that travels uniformly along the length of the internal surface of a metal tube coaxially-oriented within a larger metal tube without requiring the use of inserts, tools, liquids, extrusion, drawing, or the like.

In the inventive method, a smaller metal tube is inserted into a larger metal tube. The outside diameter of the smaller metal tube is less than the inside diameter of the larger metal tube leaving a space between the overlapped tubes. One or more shims are inserted into the space between the internal surface of the larger tube and the external surface of the smaller tube to form a uniform annular gap between the tubes running the length of the tubes.

The tubes are positioned vertically through balancing of at least one of their ends, or fixturing of at least one of their ends, to a generally flat and horizontal surface. Once retained on a flat surface, the base of the smaller tube is covered. The smaller tube is then filled with explosive material coming into direct contact with the internal surface of the smaller tube. The explosive material is detonated from its top surface within the smaller tube.

The detonation initiates an explosive front traveling uniformly down the internal surface of the smaller tube expanding the internal surface of the smaller tube with sufficient velocity to weld the smaller tube to the internal surface of the larger tube. A vacuum may be formed within the annular gap and/or gas(es) introduced therein to prevent build-up of excessive heat at the explosive front.

BRIEF DESCRIPTION OF THE DRAWINGS

The invention is described in more detail with reference to the attached drawings, in which.

DETAILED DESCRIPTION, INCLUDING BEST MODES OF CARRYING OUT THE INVENTION

The following detailed description illustrates the invention by way of example, not by way of limitation of the scope, equivalents or principles of the invention. This description will enable one skilled in the art to perform the invention, and describes several embodiments, adaptations, variations, and alternatives.

In this regard, the invention is illustrated in the figures, and is of sufficient complexity that the many parts, interrelationships, and sub-combinations thereof cannot be fully illustrated in a single patent-type drawing. For clarity and conciseness, the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
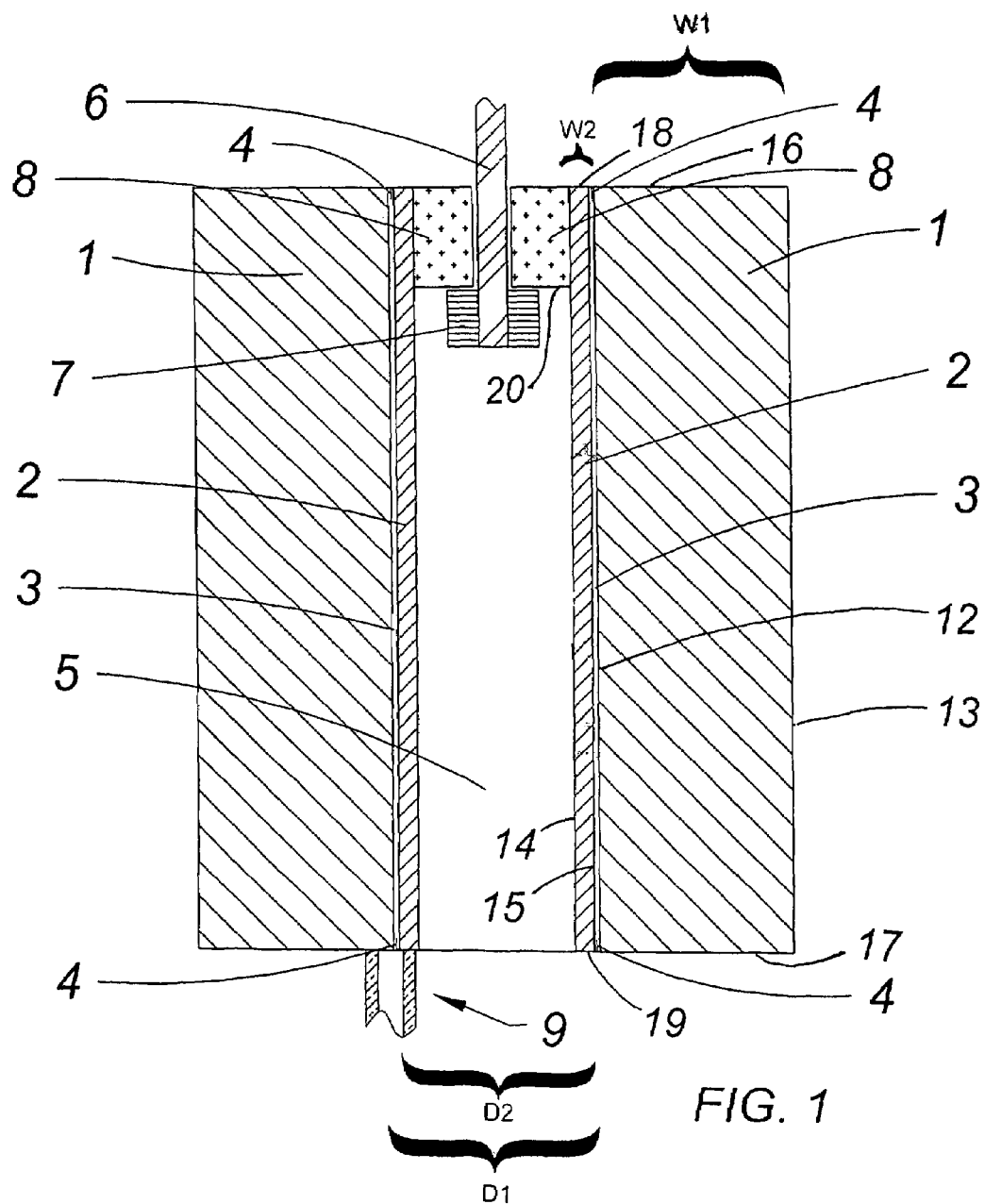
FIG. 1 shows a cross-sectional view of the assembled tubes immediately prior to detonation of the explosives; and, FIG. 2 shows a partial cross-sectional view of the explosive welding process mid-event.

FIG. 1 shows a cross-sectional view of the assembled tubes immediately prior to detonation of the explosives. As shown in FIG. 1, metal tube 1 has a smaller metal tube 2 positioned inside it. The outside diameter of tube 2 (shown as D2 in FIG. 1) is less than the inside diameter of tube 1 (shown as D1 in FIG. 1). Larger tube 1 has opposed internal 12 and external 13 surfaces; smaller tube 2 has opposed internal 14 and external 15 surfaces. Larger tube 1 has openings at a first end 16 and a second end 17; smaller tube 2 has openings at a first end 18 and a second end 19. The wall thickness of larger tube 1 is shown as W1 and is greater than the wall thickness of the smaller tube W2. The preferred range for the wall thickness for the smaller tube W2 is from 0.01 to 0.50 inches (0.25 to 12.7 mm). The length of tubes 1, 2 ranges from short tubes (of less than 12 inches or 30.5 cm) up to, and beyond, 20 feet (6.1 m).

Prior to positioning smaller tube 2 coaxially inside larger tube 1, the tubes 1, 2 may be cleaned of scale, grit or oil. The object of the cleaning is to remove oxide films by grinding the tubes with a fine finish and wiping them with acetone, or any suitable solvent, to degrease them.

After cleaning, the tubes 1, 2 are positioned coaxially. Referring to FIG. 1, at least one shim 4 is inserted or wedged into each of the spaces between the overlapping opposed tube ends 16/18, 17/19. The shims 4 retain the tubes 1, 2 in a constant position relative to one another and thereby maintain a uniform annular gap 3 running the length of the tubes 1, 2. Any suitable shape of shim 4, including a ring or wedges, and any suitable type of shim material, including wood or plastic, may be used. The shims 4 may seal the annular gap 3 or may leave openings into the annular gap 3 depending on whether a vacuum is desired in the annular gap 3 as discussed below.

As shown in FIG. 1, the uniform annular gap 3 is defined by the overlapping portions of the external surface of the smaller tube 15 and the internal surface of the larger tube 12. The width of the annular gap 3 can be measured by the distance between the external surface of the smaller tube 15 and the internal surface of the larger tube 12. In the preferred mode, the width of the annular gap 3 is approximately fifty percent (50%) of the wall thickness of the smaller tube W2.

The tubes 1, 2 are then retained in a vertical position. The tubes 1, 2 shown in FIG. 1 are of equal length and are retained in a vertical position with the tubes' second ends 17/19 resting on, and balanced on, a generally flat and horizontal surface (not shown). Once in a vertical position, the ends of the smaller and larger tubes 1, 2 are covered through contact of the second ends 17/19 against the flat surface. The tubes 1, 2 can be retained in a vertical position through any suitable means, including through balancing on their second ends 17/19 or through fixturing of one or both of the second ends 17/19 to a flat surface. If tubes 1, 2 are of different lengths (i.e., the smaller tube 2 being longer than larger tube 1 or vice versa) they may be maintained in a coaxial vertical position through any suitable means, including through use of clamps, shims, or similar devices. While a vertical orientation of the coaxial tubes 1, 2 is preferred, the method may be performed with the tubes 1, 2 in a non-vertical position, such as horizontal or tipped at an angle, provided the second end of the smaller tube 19 is covered either through contact of the second end 19 with a flat surface or insertion of a shim or other stop inside the smaller tube 2.

Referring to FIG. 1, a hose 9 is shown mounted against the second ends of the tubes 17/19 and in association with a hole in ring 4 (not shown). The hose 9 is, in turn, attached to a vacuum pump (not shown). Hose 9 enables the creation of a vacuum and/or introduction of a replacement gas into the annular gap 3 if the gap 3 has been sufficiently sealed through tight form-fitting shims 4 or other suitable means. Alternately, after a vacuum has been formed, or in lieu of a vacuum, one or more gas(es) that are less dense than air, including gas(es) that are less adiabatically compressible than air, may be introduced into the space formed by the annular gap 3. As further discussed in connection with FIG. 2, the vacuum reduces the heat build up from compressed gases formed during the explosive event. Consequently, the vacuum is particularly advantageous when bonding tubes of greater lengths to relieve the build up of gases caused by the greater and longer explosive front traveling the length of the smaller tube 2.

Referring again to FIG. 1, an explosive material 5 is then poured into smaller tube 2. No inserts or other explosive-handling devices are used to retain the explosive 5. Instead, the explosive material 5 is poured directly into the smaller tube 2, with the explosive material 5 coming into direct contact with the internal surface 14 of the smaller tube 2. As shown in FIG. 1, the explosive material 5 may fill almost the entire length of smaller tube 2. However, less explosive material 5 could be used that would not fill up the smaller tube 2, as desired.

In the preferred mode, the explosive 5 is ammonium nitrate based (Ammonium Nitrate-Fuel Oil) with a density of approximately 1.00 g/cc, having a detonation velocity between 1,800 and 2,800 m/s. Any suitable explosive 5 or combination of explosives 5 could be used. Once the explosive 5 has been poured into the smaller tube 2, the explosive material 5 will have a top surface 20 proximate the first end of the smaller tube 18.

The explosive 5 is detonated from its top surface 20. The explosive 5 can be detonated by any suitable means, including, as shown in FIG. 1, a booster comprising a detonating cord 6 and PETN based plastic explosive 7, such as C-4 plastic explosive. The booster is centrally placed proximate the top surface 20 of the ammonium nitrate based explosive 5. A washer 8 made from a material such as metal or wood is placed over the detonation cord 6 to retain the cord 6 in its central position within the smaller tube 2. The detonating cord 6 is ignited, commencing the explosive event.

Alternately, the detonating cord 6 and plastic explosive 7 may be inserted and detonated at the base of the column of explosive material 5 proximate the second end 19 of the smaller tube 2.

Figure 2:
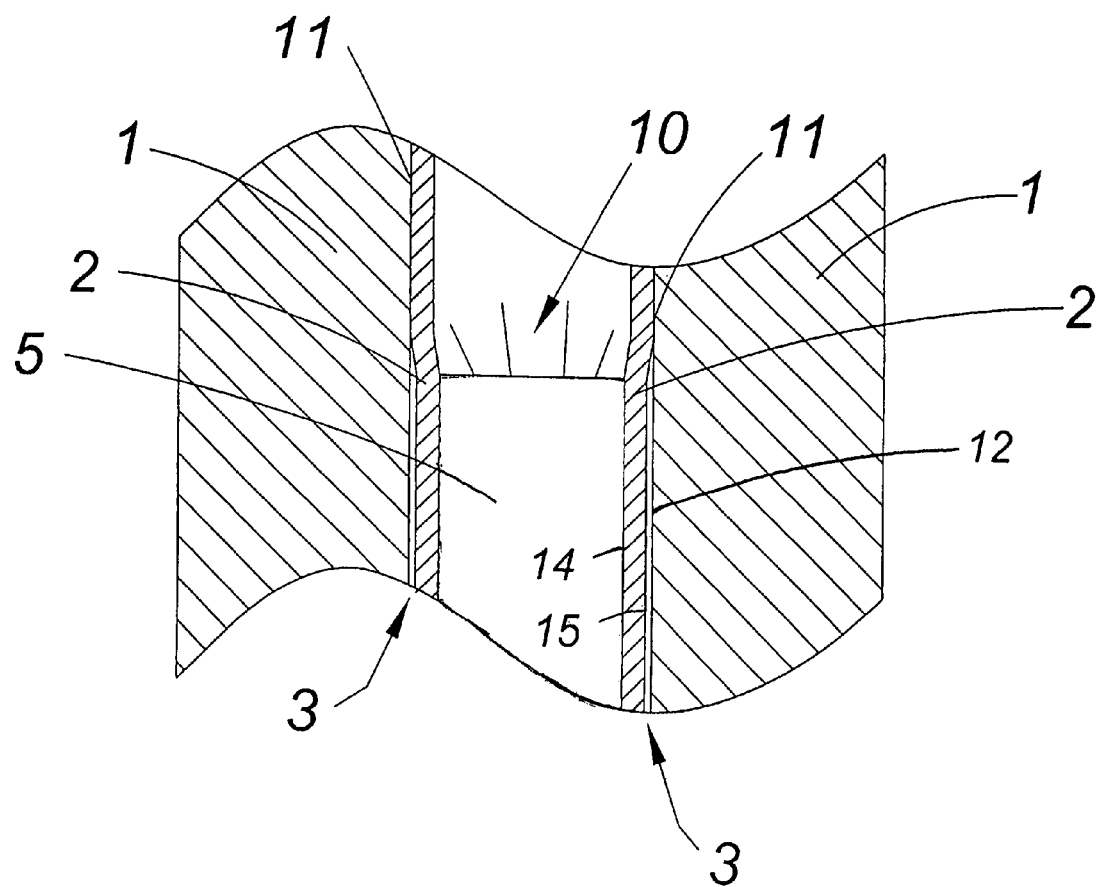

FIG. 2 shows a partial cross-sectional view of the explosive welding mid-event. After the detonating cord 6 and PETN based plastic explosive 7 shown in FIG. 1 are ignited, the ammonium nitrate based explosive 5 detonates, creating explosive forces and an explosive front 10 uniformly traveling in direct contact with, and down, the internal surface 14 of smaller tube 2. As the front 10 travels, it forces the smaller tube 2 to expand across and into the annular gap 3 with acceleration and sufficient velocity to metallurgically weld the external surface 15 of the smaller tube 2 to the internal surface 12 of larger tube 1. The smaller tube 2 accelerates and collides with the larger tube 1 with sufficient velocity to achieve a metallurgical weld and bond interface 11.

If a vacuum has been formed in the annular gap 3, such as may be desired when bonding tubes of greater lengths, the vacuum would reduce the heat build up from compressed gases formed at the explosive front 10. Similar advantages are achieved through the introduction of gas(es) into the annular gap 3 that are less adiabatically compressible than air.

Without the use of inserts, the energy transferred to the smaller tube 2 is more uniform and predictable, and further allows for the detonation of tubes of smaller diameters down to approximately 0.75 inches (1.9 cm). The inventive method also does not require the use of liquids between the explosive and the tubes, thereby reducing the pressure on the expanding tube (in this case, the smaller tube 2) and allowing tubes of smaller diameter and wall thickness to be metallurgically joined. The inventive method also does not require fixturing to contain liquids.

In an alternate mode, the smaller tube may comprise a series of two or more smaller metal tubes of same or different types of metal, each having an outside diameter less than the inside diameter of the larger tube. Conversely, the method may be performed using a larger tube comprising a series of two or more metal tubes of same or different types of metal, each having an inside diameter greater than the outside diameter of the smaller tube.

INDUSTRIAL APPLICABILITY

It is clear that the inventive method for explosive bonding of tubular metal liners of this application has wide applicability to any industry requiring tubes or pipes with metal liners of desired qualities, such as a heat and corrosion resistant metal. Such industries include firearms, oil and gas. In addition, the inventive methods and processes enable coaxial welded pipes and tubes to be manufactured in longer lengths without the uncertainties and associated costs of subsequent drawing or extruding.

It should be understood that various modifications within the scope of this invention can be made by one of ordinary skill in the art without departing from the spirit thereof and without undue experimentation. For example, tubes of varying metals, diameters and thickness may be employed; the annular gap may be different for different types of metals; the type and nature of explosive and booster may vary, and whether a vacuum or replacement gas is introduced to the annular gap may vary depending on the metals involved and the thickness and/or length of the metal liners within the tubes desired. This invention is therefore to be defined as broadly as the prior art will permit, and in view of the specification if need be, including a full range of current and future equivalents thereof.

PARTS LIST

| | |
|---|---|
| 1 | metal tube of larger inside diameter |
| 2 | metal tube of smaller outside diameter |
| 3 | annular gap |
| 4 | shim or ring |
| 5 | ammonium nitrate explosive |
| 6 | detonating cord |
| 7 | PETN based plastic explosive |
| 8 | washer |
| 9 | hose |
| 10 | explosive front |
| 11 | bond interface |
| 12 | internal surface of larger tube |
| 13 | external surface of larger tube |
| 14 | internal surface of smaller tube |
| 15 | external surface of smaller tube |

-continued

| | |
|---|---|
| 16 | first end of larger tube |
| 17 | second end of larger tube |
| 18 | first end of smaller tube |
| 19 | second end of smaller tube |
| 20 | top surface of explosive |
| D1 | inside diameter of larger tube/D2 outside diameter of smaller tube |
| W1 | wall thickness of larger tube/W2 wall thickness of smaller tube |

We claim:

1. A method of explosively welding a smaller metal tube to a larger metal tube of equal length, said smaller tube comprising an outside diameter, opposed internal and external surfaces, opposed first and second ends, and a wall thickness, said larger tube comprising an inside diameter, opposed internal and external surfaces, opposed first and second ends, and a wall thickness, wherein the outside diameter of the smaller tube is less than the inside diameter of the larger tube, the method comprising the steps of:

a) positioning the smaller tube coaxially within the larger tube;

b) inserting at least one shim between the internal surface of the larger tube and the external surface of the smaller tube forming a uniform annular gap between the smaller and larger tubes, said gap defined by overlapping portions of the coaxially-oriented external surface of the smaller tube and the internal surface of the larger tube, said gap further having a width measured by the distance between the external surface of the smaller tube and the internal surface of the larger tube;

c) covering the second end of the smaller tube;

d) filling at least a portion of the smaller tube with an explosive material bringing said explosive material in direct contact with the internal surface of the smaller tube, said explosive material, once filled, having a top surface within the smaller tube and beneath the first end of said smaller tube;

e) placing the second ends of the larger and smaller tubes on a generally flat and horizontal surface;

f) sealing the annular gap;

g) creating a vacuum in said annular gap; and h) detonating the explosive material from said top surface; wherein said detonation initiates an explosive front traveling down the internal surface of the smaller tube expanding the internal surface of the smaller tube with sufficient velocity to weld the external surface of the smaller tube to the internal surface of the larger tube.

2. The method of claim 1 including introducing into the sealed annular gap at least one replacement gas less adiabatically compressible than air.

3. The method of claim 1 further comprising fixturing at least one of the second ends of the larger and smaller tubes to the generally flat and horizontal surface.

4. The method of claim 1 including cleaning the external surface of the smaller tube.

5. The method of claim 1 including cleaning the internal surface of the larger tube.

6. The method of claim 1 wherein said explosive is ammonium nitrate based.

7. The method of claim 1 wherein the wall thickness of the smaller tube is less than the wall thickness of the larger tube.

8. The method of claim 1 wherein the width of said annular gap is approximately fifty percent of the wall thickness of the smaller tube.

9. The method of claim 1 wherein the smaller tube comprises a series of at least two metal tubes, each of said metal tubes having an outside diameter less than the inside diameter of the larger tube, said series of metal tubes comprising one or more metal tubes formed out of at least one type of metal.

10. The method of claim 1 wherein the larger tube comprises a series of at least two metal tubes, each of said metal tubes having an inside diameter greater than the outside diameter of the smaller tube, said series of metal tubes comprising one or more metal tubes formed out of at least one type of metal.

* * * * *